United States Patent
Mehlberg et al.

(10) Patent No.: US 6,721,625 B2
(45) Date of Patent: Apr. 13, 2004

(54) BARCODE DUAL LASER SCANNER TARGETING

(75) Inventors: Adam Wayne Mehlberg, Longmont, CO (US); Daniel James Plutt, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 149 days.

(21) Appl. No.: 10/026,983

(22) Filed: Dec. 20, 2001

(65) Prior Publication Data

US 2003/0120379 A1 Jun. 26, 2003

(51) Int. Cl.[7] .................................................. G06F 7/00
(52) U.S. Cl. ...................... 700/218; 700/217; 700/190; 700/245
(58) Field of Search ................................ 700/217, 218, 700/190, 189, 249

(56) References Cited

U.S. PATENT DOCUMENTS

| | | | | |
|---|---|---|---|---|
| 5,236,258 A | * | 8/1993 | Bunch | 312/9.31 |
| 5,426,581 A | * | 6/1995 | Kishi et al. | 700/64 |
| 5,546,315 A | * | 8/1996 | Kleinschnitz | 700/218 |
| 5,900,761 A | * | 5/1999 | Hideno et al. | 327/261 |
| 6,008,964 A | * | 12/1999 | Goodknight et al. | 360/92 |
| 6,213,705 B1 | * | 4/2001 | Wilson | 414/274 |
| 6,282,460 B2 | * | 8/2001 | Gilliland et al. | 700/255 |
| 6,512,963 B1 | * | 1/2003 | Felde et al. | 700/215 |

* cited by examiner

Primary Examiner—Donald P. Walsh
Assistant Examiner—Michael E Butler
(74) Attorney, Agent, or Firm—Carstens, Yee & Cahoon, LLP

(57) ABSTRACT

A robot apparatus with a first barcode scanner to be used for collecting positional data perpendicular to its scan direction and a second barcode scanner to be used for collecting positional data perpendicular to its scan direction where the first and second barcode scanner are mounted substantially orthogonal to each other is, for example, a library storage system, is provided. The first barcode scanner scans the target while the robotic apparatus is moved in a direction perpendicular to the scan path of the first barcode scanner. The second barcode scanner scans a second target substantially orthogonal to the first target while the robot is moved substantially perpendicular to the scan path of the second barcode scanner. Positional data is collected in conjunction with the readability limits of the first and the second target. The central position of the first and second target in a substantially perpendicular direction to the scan path is determined by the readability of the target and the correlating positional data of the robot.

12 Claims, 4 Drawing Sheets

MASTER CALIBRATION AREA

SIDE VIEW

TOP VIEW

BARCODE DUAL LASER SCANNER TARGETING

BACKGROUND OF THE INVENTION

1. Field of the Invention

The present invention relates generally to an apparatus for calibrating an apparatus for retrieving objects from an array of storage cells.

2. Background of the Invention

Storage library systems are capable of storing and rapidly retrieving large quantities of information stored on storage media cartridges. Such storage library systems often use robotic mechanisms to improve the speed of information retrieval and the reliability of maintaining the storage library cartridge inventory. These robotic mechanisms typically comprise a hand mechanism positioned on a movable arm. To retrieve information, the robotic arm is moved to position the hand near the inventory location of a desired media cartridge. The hand is then activated to grip the desired cartridge and remove it from the library inventory location. The robotic arm with the hand gripping the cartridge then moves to an appropriate position to further process the cartridge. In this manner, the robotic hand manipulates the cartridge for access to information stored on the cartridge.

However, in order to grip the cartridge, the position of the robotic arm with respect to the cartridge within the library must be determined. Positional accuracy of the robotic arm and any devices attached thereto affects both the repeatability of an operation as well as the ability of the robotic arm to accurately perform the particular task required of it. There are many different arm calibration arrangements known in the art, and many of these entail the use of some sort of sensor to determine the position of the robotic arm.

A common method of calibrating the position of the robotic arm gripper mechanism is to use a vision system to orient the robotic arm with respect to one or more baseline targets located in the work space. Often these vision systems are located underneath or above the robotic arm and are oriented at an angle relative to the robotic arm. These vision systems are located at an angle so that a target on the work space can be imaged, and then a target located on a part of the robotic arm that is extended into the field of view of the vision system is imaged. The two images are compared and the position of the robotic arm is adjusted such that the target on the robotic arm is aligned with the target on the work piece when extended.

However, orienting the vision system at an angle causes the inclusion of the vision system with the robotic arm to take up a large amount of space. Thus, a significant portion of the space within the storage library system is unusable for placing storage cells. This is due to the fact that if, for example, the vision system is located below the robotic arm, an amount of space equal to the height or thickness of the angled vision system at the bottom of the storage retrieval system cannot be accessed by the robotic arm since the vision system comes into contact with the floor of the storage library system before the robotic arm. Thus, the robotic arm is prevented from going low enough within the storage library system to engage and retrieve an object stored in a storage cell located within the thickness of the angled vision system from the floor of the storage library system.

However, as the need to store more and more data increases and the price paid for space also increases, the amount of money necessary to store data is increased. Thus, the wasted space within a library storage system becomes more and more intolerable. Therefore, there is a need for a calibration system that requires less space than current systems and that allows for a denser concentration of storage cells within a storage library system.

SUMMARY OF THE INVENTION

The present invention provides a robot apparatus with a first barcode scanner to be used for collecting positional data perpendicular to its scan direction and a second barcode scanner to be used for collecting positional data perpendicular to its scan direction where the first and second barcode scanners are mounted substantially orthogonal to each other in, for example, a library storage system. The first barcode scanner scans the target while the robotic apparatus is moved in a direction perpendicular to the scan path of the first barcode scanner. The second barcode scanner scans a second target substantially orthogonal to the first target while the robot is moved substantially perpendicular to the scan path of the second barcode scanner. Positional data is collected in conjunction with the readability limits of the first and the second target. The central position of the first and second target in a substantially perpendicular direction to the scan path is determined by the readability of the target and the correlating positional data of the robot.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
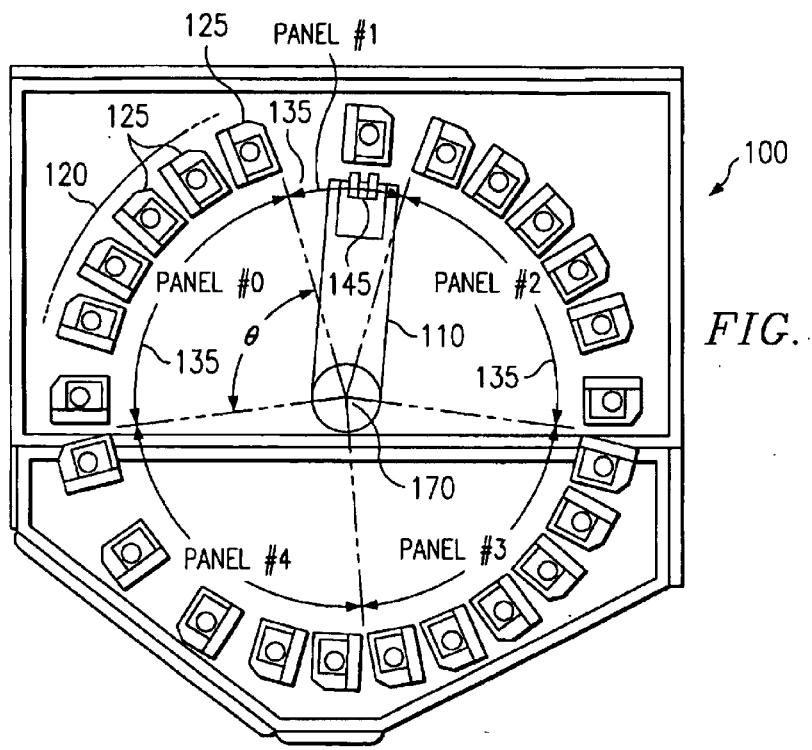
FIG. 1 depicts a top view of the overall architecture of a typical automated robotic tape library system wherein the calibration system of the present invention is employed.

With reference now to the Figures and, in particular, with reference to FIG. 1, a top view of the overall architecture of a typical automated robotic tape library system 100 wherein the calibration system of the present invention is employed is depicted. A typical automated library system operates to store and retrieve a large number of magnetic tape cartridges for an associated host processor. Library system 100 includes an array 120 of circularly arranged cells 130 for storing magnetic tape cartridges. A robotic arm 110 is pivotally rotatable about the center of array 120 and contains a tape cartridge retrieval mechanism 145.

Figure 2:
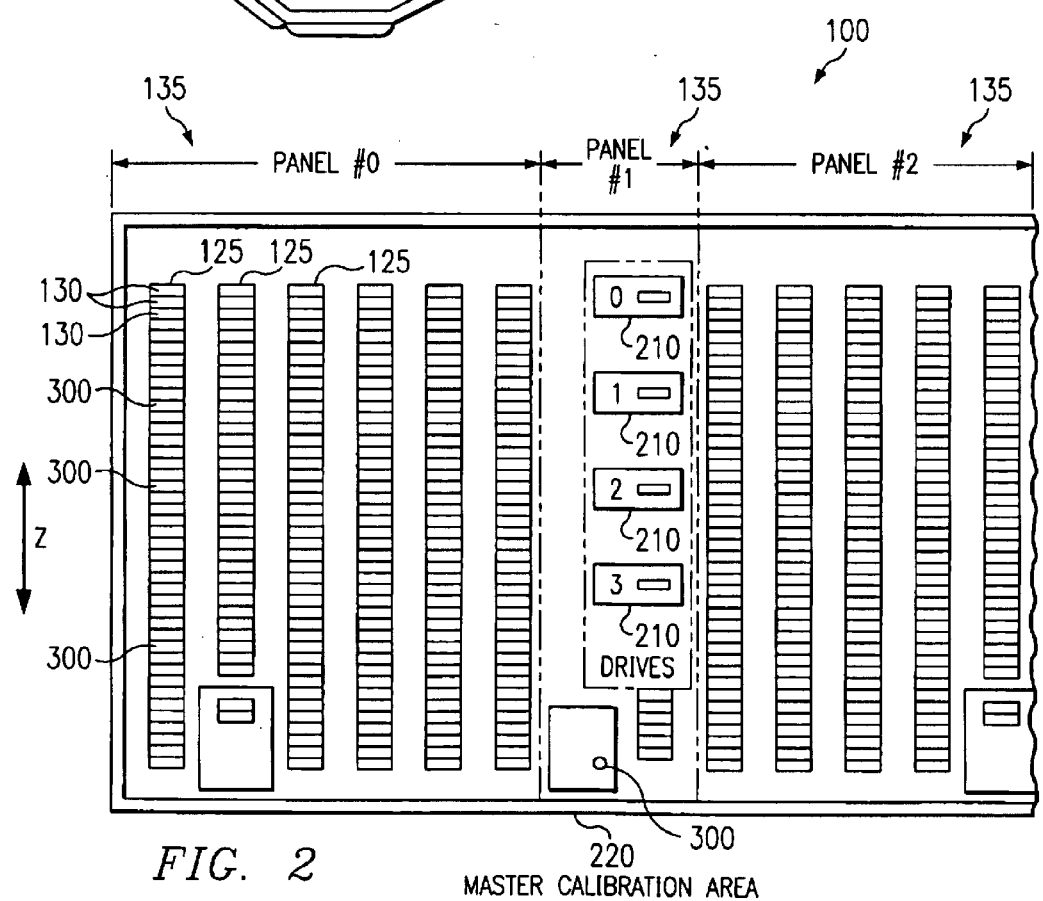
FIG. 2 depicts a side view of a segment of library system in accordance with the present invention.

Referring now to FIG. 2, a side view of a segment of library system 100 is depicted in accordance with the present invention. Tape cartridge retrieval mechanism 145 is located in a position for retrieving and replacing tape cartridges in the tape cartridge storage cells 130. The retrieved tape cartridges are loaded into a tape transport mechanism (tape drives) 210 in response to a read/write request from a host computer (not shown) which is connected to library system 100. Tape cartridge storage cells 130 and tape drives 210 are arranged in columns 125 which are grouped in "panels" 135.

Library system 100 is provided as an example of a library system in which the present invention may be implemented. However, the present invention is not limited to use in silo type library systems, but may be used in any other type of library system, such as, for example, linear library systems and U-shaped library systems.

Figure 3:
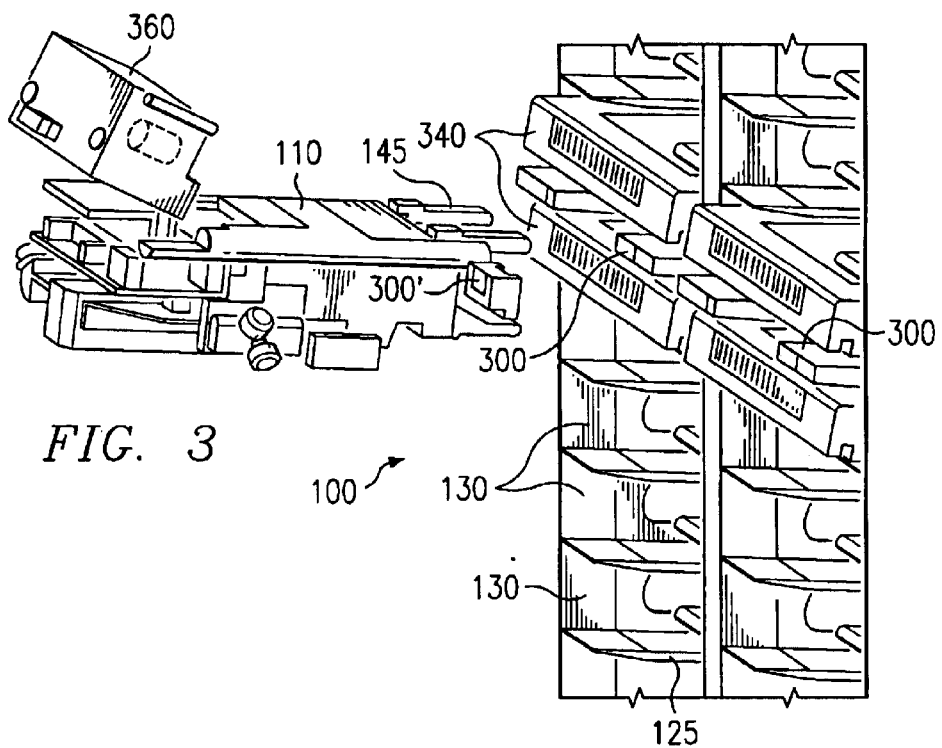
FIG. 3 shows a perspective cutaway view of a tape library system showing several of the plurality of locations of target.
Figure 4:
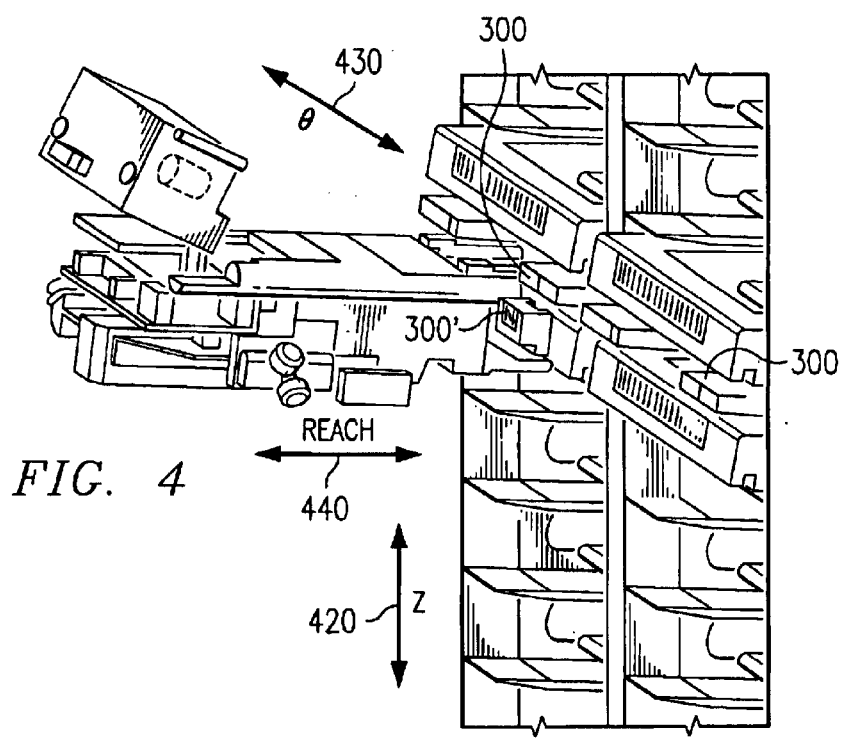
FIG. 4 illustrates the environment shown in FIG. 3 wherein the robotic arm retrieval mechanisms shown in FIG. 3 is grasping a tape cartridge with the robotic arm target positioned in close proximity to a cartridge cell.

Referring now to FIGS. 3 and 4, perspective cutaway views of a prior art robotic arm and storage cells suitable for use with tape library system 100 are depicted. FIG. 3 shows a perspective cutaway view of a tape library system showing several of the plurality of locations of target 300.

In the prior art, one or more "N"-shaped calibration targets 300 are located on each column 125 of tape cartridge storage cells 130. The position of the robotic arm 110 with respect to the tape cartridge storage cells 130 is determined and adjusted by using a line scan camera vision system 360 to scan these calibration targets 300 located in each of the columns 125. An "N"-shaped target 300' located on the cartridge retrieval mechanism 145 is also used to calibrate the position of the camera 360 with respect to the cartridge retrieval mechanisms 145.

FIG. 4 illustrates the environment shown in FIG. 3 wherein the robotic arm retrieval mechanisms shown in FIG. 3 is grasping a tape cartridge 340 with the robotic arm target 300 positioned in close proximity to a cartridge cell.

Figure 5:
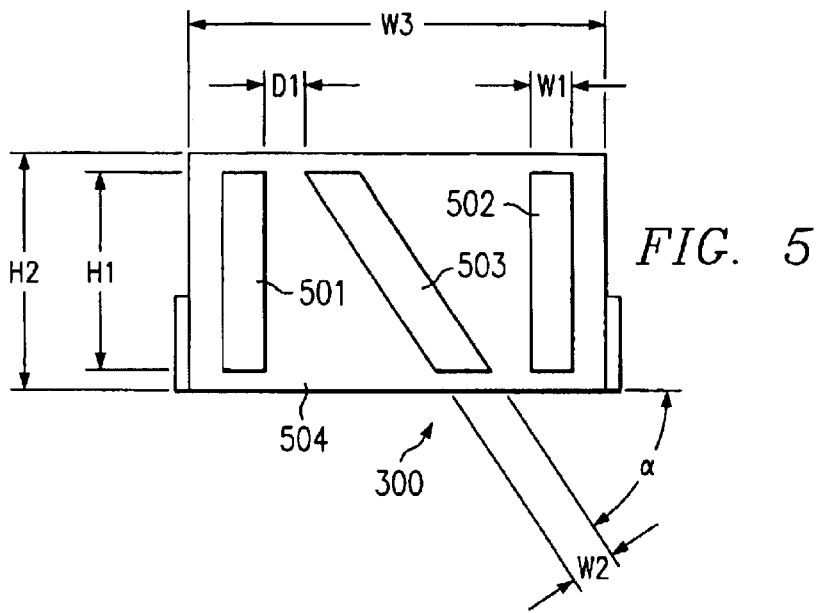
FIG. 5 depicts a diagram illustrating a calibration target in accordance with the prior art.

Referring now to FIG. 5, a diagram illustrating a calibration target, which can be implemented as calibration target 300 in FIG. 3, is depicted in accordance with the prior art. Position calibration target 300 comprises two elements, a background 504 and a plurality of positioning indicia 501–503 imprinted thereon. The positioning indicia 501–503 and the background 304 are selected to be easily distinguishable from each other to enable the line scan camera system to precisely delimit the plurality of positioning indicia 501–503 from the background 504. This is accomplished by the use of contrasting colors whose reflectivity is significantly different. An example of this would be the use of white positioning indicia 501–503 printed on a black background 504. The use of this difference in reflectivity simplifies the task of the line scan camera to delimit the position and boundaries of the plurality of positioning indicia 501–503. Alternatively, other methods that provide high contrast, such as, for example, light producing elements, may be used to produce the target.

As illustrated in FIG. 5, the plurality of positioning indicia 501–503 comprise a pair of parallel oriented, spaced apart, substantially rectangular bars 501 and 502, each of which has a first end and a second end with, for example, the first end being located at the top of FIG. 5 and the bottom end being located at the bottom of FIG. 5 for the purpose of this description. The third positioning indicia comprises diagonal bar 503 which is substantially parallelogram shaped and extends diagonally from the first end of indicia 501 to the second end of indicia 502 such that indicia 503 comprises a diagonal bar that can be used as described below to assist in the position determination process. Each of the parallel indicia 501, 502 is of substantially the same dimensions having a width W1 and a height H1 while the parallelogram shaped bar 503 has a width W2 and a height H1. The selection of exact values for these dimensions is a matter of design choice and is somewhat dictated by the selection of the line scan camera 460 used for the positioning determination. The overall target 500 has a width W3 and a height H2 such that the parallel oriented indicia 501, 502 extend substantially along the full height of target 500 while the diagonal indicia 503 traverses a significant portion of the width W3 of target 500. The parallelogram shaped indicia 503 as illustrated in FIG. 5 does not come in contact with either indicia 501 or 502 but is spaced apart there from by a distance D1 in order to provide three distinct indicia for positioning purposes. Optionally, indicia 503 can be joined at either end with indicia 501 and 502 to form a substantially N-shaped pattern on target 300. The parallelogram shaped indicia 503 is angled at an angle α from the horizontal as shown in FIG. 5.

However, in the prior art, camera vision system 360 is a line scan camera and thus, takes up a considerable amount of space either above the robotic arm 110 and cartridge retrieval mechanism 145 (also referred to as a robotic hand or gripper) or below the robotic arm 110 and cartridge retrieval mechanism 145. This extra space needed for the camera vision system 360 reduces the number of storage cells 130 that can be placed in a given area since vertical space needed to accommodate the camera vision system 360 cannot be used to provide storage cells 130. Therefore, in order to increase the density of storage cells 130 in a particular library, the camera vision system 360 of the present invention is implemented as a barcode scanner rather than a line scan camera as was typical in the prior art. Barcode scanners are commonly available products used in systems, such as, for example, check out scanners for super markets and are well known in the art. A barcode scanner is smaller than a line scan camera. Therefore, less space is needed to accommodate the barcode scanner. Thus, more room is available for storage cells, thereby increasing the storage density of a storage library.

Figure 6A:
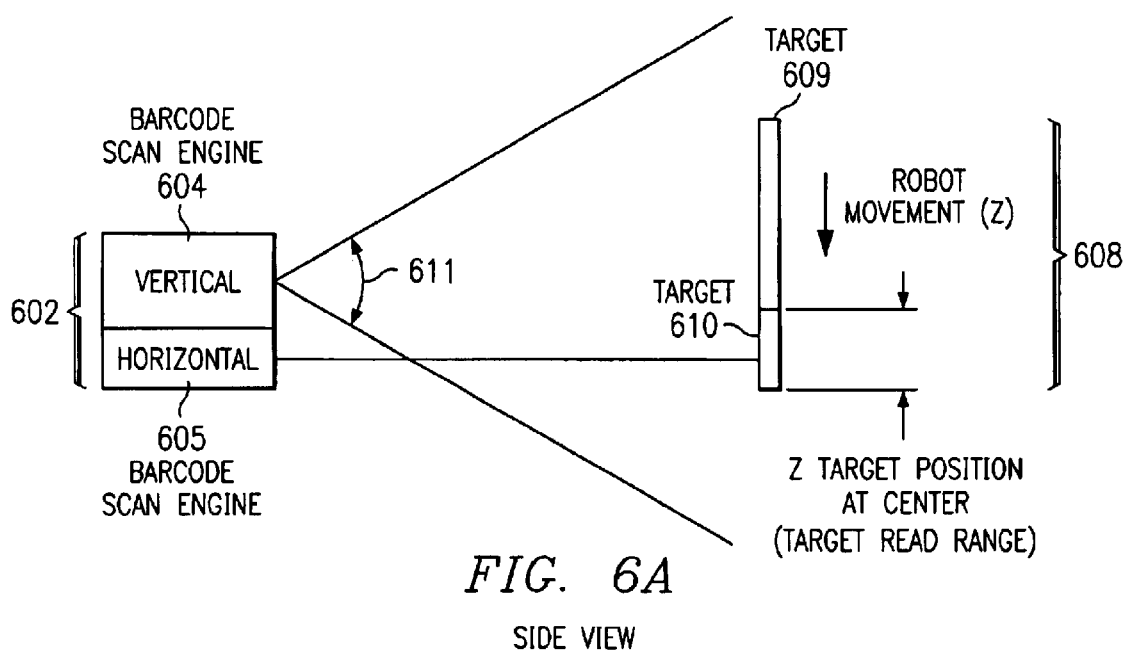
FIGS. 6A–6B depict a side view and a top view diagram of a barcode scan apparatus suitable for use with a cartridge retrieval system in accordance with the present invention.
Figure 6B:
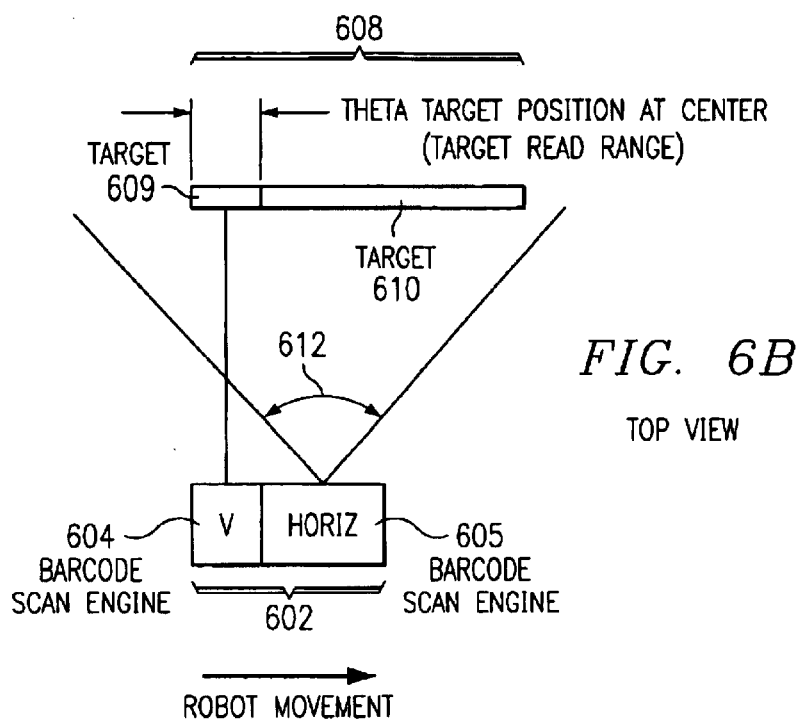

With reference now to FIGS. 6A–6B, side and top view diagrams of a barcode scan apparatus suitable for use with a cartridge retrieval system is depicted in accordance with the present invention. Barcode scan apparatus 602 may be implemented as camera vision system 360 in FIG. 3. Barcode scan apparatus 602 includes two barcode scan engines 604 and 605. Barcode scan apparatus 602 is smaller than the line scan camera used in the prior art. Therefore, a smaller amount of space is necessary to accommodate the camera vision system 360. Thus, more space in the library storage system may be devoted to storage cells, thereby increasing the storage density of the library storage system.

Barcode scanners or engines have not been used for calibration purposes in the prior art because the output from barcode scanners is merely the decoded value of the bar code scanned by the barcode scanner. Therefore, barcode scanners do not provide any pixel data. Furthermore, the scan width of the laser scanner beam from barcode laser scanners is not controlled. Therefore, the proper calibration measurements cannot be made. One reason for this is that the width of the scanner scan path 611 and 612 is affected by movement in directions substantially parallel to the orientation of the scanner scan path 611 and 612.

In order to overcome these shortcomings, the present invention incorporates two barcode scan engines 604 and 605 and a target barcode 608. Each of the two barcode scan engines 604 and 605 are oriented substantially orthogonal to one another such that one barcode scan engine 604 has a scanner scan path 611 in a direction that is substantially orthogonal to the direction of the scanner scan path 612 of the other barcode scan engine 605. Each scan engine 604 reads a different component 609 and 610 of the target 608.

To determine the center of the target in one direction, for example, the theta direction, the robotic arm 110 is moved in the theta direction as depicted in FIG. 6B until the theta component 609 of target 608 first becomes readable by the barcode scanner engine 604 with its scan path 611 oriented in a direction substantially orthogonal to the theta direction. This position is recorded through the use of a positional encoding device. The robotic arm 110 continues to move in the theta direction until the target is no longer readable by the barcode scanner engine 604. This position is also recorded. The center of the target in the theta direction is then the half distance position between these two positions.

To determine the center position of the target with reference to the z-direction (i.e. a direction substantially orthogonal to the theta direction), the robotic arm 110 is moved in the z-direction as depicted in FIG. 6A until the z-component 610 of target 608 first becomes readable by the barcode scanner engine 605 that has its scan path 612 oriented in the theta direction (i.e. a direction substantially orthogonal to the direction of movement of the robotic arm 110). This position is then recorded through the use of a positional encoding device. The robotic arm 110 continues to move in the z-direction until the target is no longer readable by the second scan engine 605. This position is also recorded. The center of the z-component 610 of the target 608 in the z-direction is then the point halfway between these two z-direction coordinates. Thus, the center of the target for calibration purposes is determined using barcode scanners without resort to methods of limiting or controlling the scan width of the barcode scanners.

Figure 7:
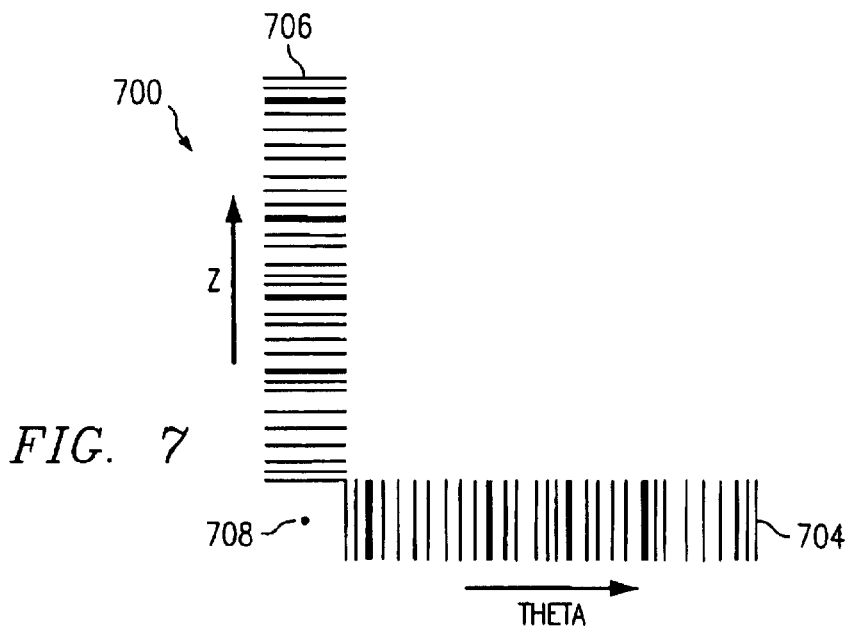
FIG. 7 depicts an exemplary calibration target having two bar codes positioned orthogonal to one another in accordance with one embodiment of the present invention.

With reference now to FIG. 7, a target having two barcodes positioned substantially orthogonal to one another is depicted in accordance with the present invention. Target 700 is an example of a target that may be used for target 608 in FIGS. 6A–6B. Barcode 706 may be implemented as the theta component 609 of the target 608 in FIGS. 6A–6B. Barcode 704 may be implemented as the z-component 610 of the target 608 in FIGS. 6A–6B. The robotic arm 110 first moves in one of the directions, for example, the theta direction, and the barcode scanner 604 which has a scan path 611 not affected by movement in the theta direction, scans bar code 706 to determine the position at which the barcode 706 is first readable and the position at which the barcode 706 is no longer readable. The center 708 of the target, as defined on the target 700 for calibration purposes, in the theta direction is the position half way between these two points.

The robotic arm 110 then moves in the z direction and the barcode laser scanner 605 whose scan path 612 is not affected by movement in the z direction scans barcode 704 to determine the position at which the barcode 704 becomes readable and the position at which the barcode 704 ceases to be readable. Again, the z-position of the center 708 of the target is determined by the position half way between these two values.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. For example, other type of scan engines may be used rather than a laser scan engine.

What is claimed is:

1. A positional determination device, the device comprising:
    a first barcode scanner with a first scan path, wherein the first barcode scanner is affixed to a moveable object;
    a second barcode scanner with a second scan path oriented in a direction substantially orthogonal to the direction of the first scan path, wherein the second barcode scanner is affixed to the moveable object;
    a positional encoding device for determining the location of the object in two substantially orthogonal coordinates with respect to an external object having a target.

2. The device as recited in claim 1, wherein the positional encoding device determines the position of the object relative to the external object in the first direction from signals received from the second barcode scanner based on object movement in the first direction.

3. The device as recited in claim 1, wherein the positional encoding device determines the position of the object relative to the external object in the second direction from signals received from the first barcode scanner based on object movement in the second direction.

4. The device as recited in claim 1, wherein the target comprises a first component and a second component.

5. The device as recited in claim 1, wherein at least one of the first and second components of the target is a barcode.

6. The device as recited in claim 1, wherein at least one of the first and second barcode scanners comprises a laser.

7. A method for determining the position of a robot relative to a target, the method comprising:
    translating a robot in a first direction, wherein the robot has a first and second barcode scanner, wherein each of the first and second barcode scanners have a scan path wherein the scan path for the first barcode scanner is oriented substantially in the first direction and the scan path for the second barcode scanner is oriented substantially in a second direction wherein the second direction is substantially perpendicular to the first direction,
    while translating the robot in the first direction, determining with the second barcode scanner the positions at which the target first becomes readable and then again becomes unreadable to the second barcode scanner;
    translating the robot in the second direction;
    while translating the robot in the second direction, determining with the first barcode scanner the positions at which the target first becomes readable and then again becomes unreadable to the first barcode scanner; and
    determining the center of the target from measurements taken by the first and second barcode scanners.

8. The method as recited in claim 7, wherein the determination of the center of the target in the first direction comprises assigning the value of the midpoint between the positions at which the target first becomes readable and then again becomes unreadable to the second barcode scanner.

9. The method as recited in claim 7, wherein the determination of the center of the target in the second direction comprises assigning the value of the midpoint between the positions at which the target first becomes readable and then again becomes unreadable to the first barcode scanner.

10. A system for determining the position of a robot relative to a target, the system comprising:

first means for translating a robot in a first direction, wherein the robot has a first and second barcode scanner, wherein each of the first and second barcode scanners have a scan path wherein the scan path for the first barcode scanner is oriented substantially in the first direction and the scan path for the second barcode scanner is oriented substantially in a second direction wherein the second direction is substantially perpendicular to the first direction, second means, while translating the robot in the first direction, for determining with the second barcode scanner the positions at which the target first becomes readable and then again becomes unreadable to the second barcode scanner;

third means for translating the robot in the second direction;

fourth means, while translating the robot in the second direction, for determining with the first barcode scanner the positions at which the target first becomes readable and then again becomes unreadable to the first barcode scanner; and fifth means determining the center of the target from measurements taken by the first and second barcode scanners.

11. The system as recited in claim 10, wherein the determination of the center of the target in the first direction comprises assigning the value of the midpoint between the positions at which the target first becomes readable and then again becomes unreadable to the second barcode scanner.

12. The system as recited in claim 10, wherein the determination of the center of the target in the second direction comprises assigning the value of the midpoint between the positions at which the target first becomes readable and then again becomes unreadable to the first barcode scanner.

* * * * *